United States Patent [19]

Alvero et al.

[11] 4,416,521

[45] Nov. 22, 1983

[54] SYSTEM AND METHOD FOR DETERMINING THE LIGHT TRANSMISSION CHARACTERISTICS OF COLOR PICTURE TUBE SHADOW MASKS

[75] Inventors: Ernesto J. Alvero; William R. Kelly, both of Lancaster, Pa.

[73] Assignee: RCA Corporation, New York, N.Y.

[21] Appl. No.: 267,749

[22] Filed: May 28, 1981

[51] Int. Cl.[3] .............................................. G03B 41/00

[52] U.S. Cl. ........................................ 354/1; 250/205; 430/24

[58] Field of Search ................ 250/205, 559; 356/443, 356/444; 430/24, 30; 354/1

[56] References Cited

U.S. PATENT DOCUMENTS 4,053,906 10/1977 Schultz ............................ 430/24 X 4,059,834 11/1977 Hosokoshi et al. ............... 430/24 X 4,256,390 3/1981 Fisher et al. ........................... 354/1

*Primary Examiner*—David C. Nelms

*Assistant Examiner*—Edward P. Westin

*Attorney, Agent, or Firm*—Eugene M. Whitacre; Dennis H. Irlbeck; Lester L. Hallacher

[57] ABSTRACT

A system for determining the exposure time required for a lighthouse to expose the screen of a television panel in accordance with the light transmission characteristics of the shadow mask includes means for providing the actual light transmission characteristics of the shadow mask. The minimum and maximum acceptable transmission values are subtracted to form a transmission range. The actual transmission characteristics and the minimum transmission value are combined to provide a transmission difference signal. The transmission difference and the transmission range are converted into a ratio which is used to determine a transmission percentage. The percentage is combined with a maximum transmission time to establish the exposure time.

7 Claims, 2 Drawing Figures

SYSTEM AND METHOD FOR DETERMINING THE LIGHT TRANSMISSION CHARACTERISTICS OF COLOR PICTURE TUBE SHADOW MASKS

BACKGROUND OF THE INVENTION

This invention relates generally to the production of phosphor screens for shadow mask type color picture tubes and particularly to a system and method for determining the exposure time required to produce such screens under conditions in which the intensity of the exposing light transmission characteristics of the shadow mask vary.

A color picture tube includes a screen composed of triads of different phosphor which emit different colored light when excited by electrons. Typically, the system is composed of alternating stripes of phosphors which respectively emit red, green and blue light. Positioned between the screen and the electron gun from which the electrons emanate is an apertured color selection electrode, commonly called a shadow mask. The shadow mask assures that the electron beams excite phosphor stripes of the proper color.

During the production of the phosphor screen the entire inside surface of the panel is coated with one of the phosphors mixed in a photosensitive material. The shadow mask is then inserted into the panel and the assembly is placed on a lighthouse which contains a light source. Light from the light source passes through the apertures in the shadow mask and exposes some of the phosphor. The shadow mask is then removed and the unexposed phosphor is washed away leaving only the exposed phosphor. This process is then repeated for the remaining two colors of phosphors.

U.S. application Ser. No. 267,750 entitled "System And Method For Controlling The Exposure Of Color Picture Tube Phosphor Screens" filed on even date herewith by William R. Kelly and Ernesto J. Alvero and assigned to RCA Corporation, the assignee of the instant invention, discloses a system for controlling the exposure time-intensity multiple of the lighthouse which is used to automatically expose the phosphors on kinescope faceplate panels of differing sizes.

U.S. application Ser. No. 267,991, now U.S. Pat. No. 4,370,036, entitled "System And Method For Intermittently Moving A Picture Tube Panel On A Lighthouse" filed on even date herewith by William R. Kelly and Ernesto J. Alvero and assigned to RCA Corporation, the assignee of the instant invention, discloses a system for intermittently moving a faceplate panel along a lighthouse during the exposure of the phosphors.

Both systems disclosed in the referenced patent applications require the accurate input of the light transmission characteristics of the shadow mask contained within the panels being exposed. Accordingly, irrespective of whether or not the light transmission characteristics of the shadow mask are input to the systems by use of automatic input means, such as a programmed computer or a microprocessor, or manually set into the system by the utilization of thumb wheel switches on the panel of the system, the intended operation of both the systems is dependent upon receiving accurately determined light transmission characteristics of the shadow mask contained within the faceplate panel being exposed.

Additionally, because the system described in the referenced applications are intended for use on assembly lines in which faceplate panels of varying sizes are selected at random, the light transmission characteristics of the shadow masks within the individual panels must be accurately categorized and input to the processing systems.

The instant invention is directed to a system for determining the light transmission characteristics of color picture tube shadow masks of varying sizes and types and for calculating the time required to properly expose the phosphor screens associated with such shadow masks.

SUMMARY OF THE INVENTION

A system for determining the exposure time required for a lighthouse to expose the screen of a picture tube faceplate panel in accordance with the light transmission characteristics of the shadow mask includes means for providing the actual transmission characteristics of the shadow mask. The minimum and maximum acceptable transmission values also are provided. The actual transmission characteristic and the minimum transmission characteristic are combined to provide a transmission difference signal. The minimum and maximum transmission signals are combined to provide a transmission range. The transmission difference and the transmission range are converted into a ratio. The ratio is used to determine a transmission percentage which is combined with a maximum transmission time to establish the exposure time.

DETAILED DESCRIPTION OF THE PREFERRED EMBODIMENT

Figure 1:
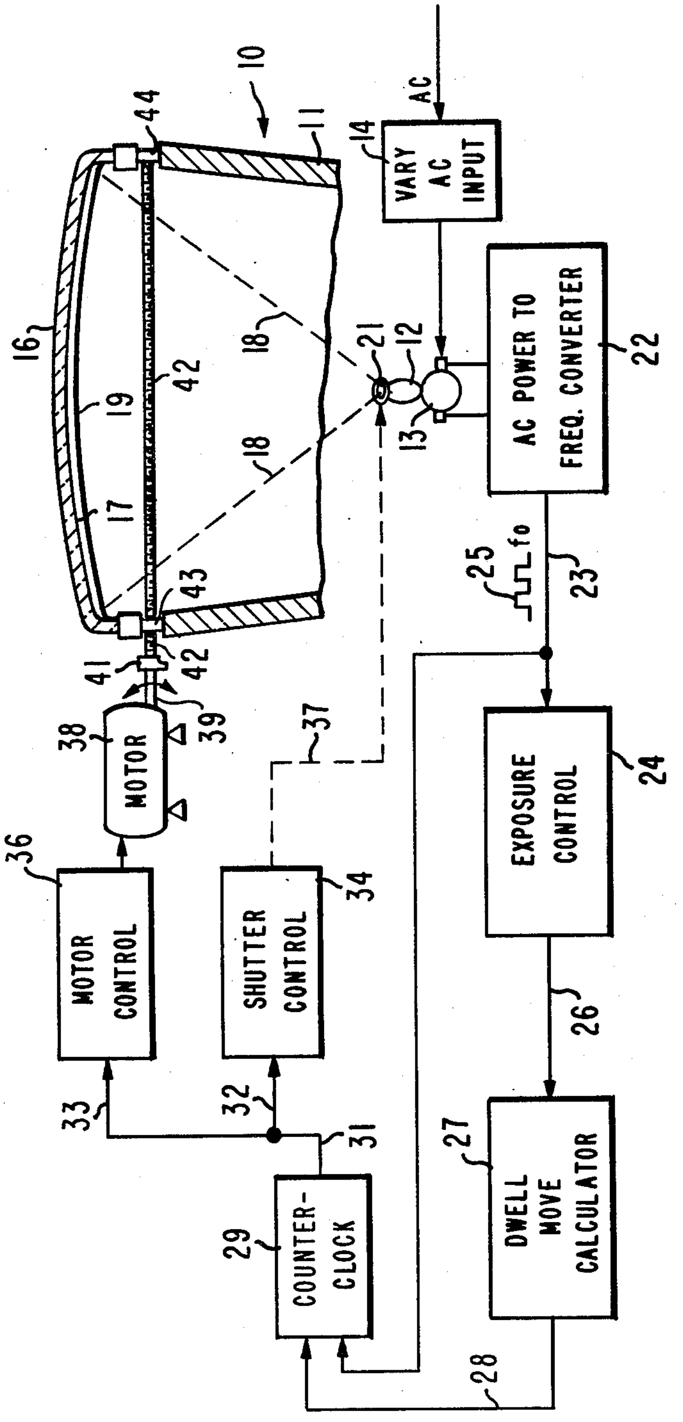
FIG. 1 is a simplified showing of a system for automatically controlling the exposure of a television screen in which the invention can be utilized.

In FIG. 1, a Lighthouse 10 of known type includes a Housing 11, shown simplified and partially broken away. The Lighthouse 10 includes an actinic energy source which, typically, in the manufacture of color television screens is a Mercury Arc Lamp 12. A Power Supply 13, of known type, energizes the Lamp 12. AC power is applied to the Power Supply 13 through a Variable Input Circuit 14 to permit desired variations of the AC power supplied to the Lamp 12.

A Picture Tube Faceplate Panel 16 is positioned on the Lighthouse 10. The inside surface of the Panel 16 is provided with a screen in the form of a Coating 17 of actinic energy sensitive material which chemically reacts when exposed to the Energy 18 emanating from the Actinic Energy Source 12. Typically, in color picture tubes, the actinic energy sensitive material is phosphor. Arranged between the Lamp 12 and the Coating 17 is a Shadow Mask 19. The Shadow Mask 19 contains apertures through which electrons pass to excite the Coating 17 when the kinescope is in operation. The light from the Lamp 12 therefore passes through the shadow mask apertures and exposes the aperture pattern onto the Coating 17. Any variation in the power to the Lamp 12 will cause the lamp intensity to vary resulting in different exposure of the Coating 17 and a lack of uniformity in the screens produced on the Lighthouse 10. This is avoided by monitoring the power output of the Power Supply 13 and generating an output signal which reflects the changes in the energizing power. The output signal is used to generate a control signal having a time dependent characteristic determined by the power changes.

A Shutter 21, of known type, is arranged between the Lamp 12 and the Coating 17 and is used to control the impingement of Light Rays 18 on the Coating 17 by opening and closing the shutter. This technique is well known in lighthouse and color picture tube screening art and accordingly, additional details are not presented herein.

The energizing power to the Power Supply 13 is monitored by an AC To Frequency Converter 22. The Output Signal 25 of the Frequency Converter 22 is a binary signal, such as a square wave, having a Frequency $f_o$. This signal is coupled by a Line 23 to an Exposure Control Circuit 24, the details of which are explained hereinafter with reference to FIG. 2. The output signal of the Exposure Control 24 is coupled by a Line 26 to a Dwell-Move Calculator 27, which moves the Panel 16 in incremental fashion to remove undesirable variations in the widths of the phosphor lines within the screen which frequently occur because of vibration of the Shadow Mask 19 during constant panel motion.

An output Line 28 couples the output signal of the Dwell-Move Calculator 27 to a Counter-Clock 29. The Counter-Clock 29 provides output pulses on an Output Lead 31 in accordance with the Frequency $f_o$ of the square wave Control Signal 25 provided by the Power to Frequency Converter 22. The Lead 31 is connected to Leads 32 and 33 which respectively are the input leads of a Shutter Control 34 and a Motor Control 36. The Shutter Control 34 is coupled by a Lead 37 to the Shutter 21 to control the exposure of the Coating 17 by light from the Lamp 12. The output signal of the Motor Control 36 is provided to a Motor 38, such as a stepping motor. The Shaft 39 of the Motor 38 is connected by a Coupling 41 to a Lead Screw 42 which is fed through Threaded Mounting Brackets 43 and 44. Accordingly, rotation of the Shaft 39 results in linear movement of the Panel 16 with respect to the Lighthouse 10.

Figure 2:
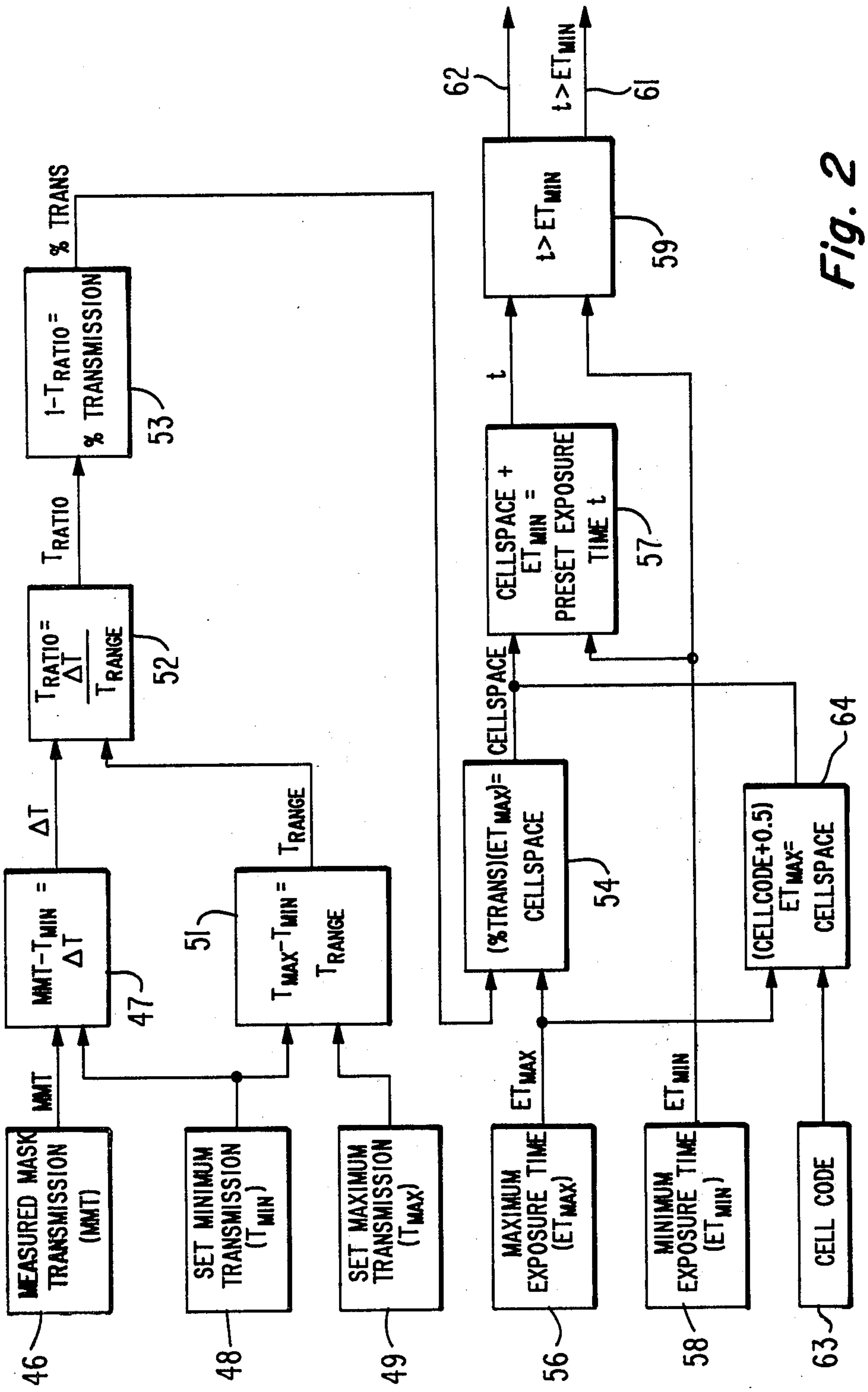
FIG. 2 is a preferred embodiment of the invention.

In FIG. 2, a Signal Generator 46 provides a Measured Mask Transmission Signal MMT which is representative of the measured transmission characteristic of the Shadow Mask 19. The light transmission characteristic of a shadow mask can be measured in any of several methods available in the art, such as that disclosed in patent application Ser. No. 18909, filed Mar. 3, 1979 by William J. Maddox, now U.S. Pat. No. 4,289,406 entitled "Light Transmission Measurement Method" assigned to RCA Corporation, the assignee of the instant application. The Measured Mask Transmission Signal MMT can be provided to the system using any of several methods. For example, the value can be set using thumb wheel switches on the panel of the system. Alternatively, when an industrial robot which includes a programmable computer having memory capabilities is used the signal can be stored in the memory and called from the memory when a Faceplate Panel 16 is placed upon the lighthouse. Irrespective of the method employed in inputting the signal to the system, the Measured Mask Transmission Signal MMT is provided as an input to an Adder 47.

A Minimum Transmission Signal Generator 48 provides a Minimum Transmission Signal $T_{MIN}$ which is representative of the minimum transmission capability of the Shadow Mask 19 permissible for the system. This signal is representative of the minimum light transmission capability of the shadow mask of a particular tube type and is changed each time a different type type is placed on the Lighthouse 10. Accordingly, this value also can be provided by either thumb wheel switches or the programmable computer. The output of the Signal Generator 48 also is provided to the Adder 47 which algebraically combines the Measured Mask Transmission Signal MMT and the Minimum Transmission Signal $T_{MIN}$ to provide a Difference Transmission Signal $\Delta T$ which is representative of the difference between the two input signals. The $T_{MIN}$ Signal provided by the Minimum Transmission Generator 48 establishes the minimum transmission capability of the system and therefore the output of the Adder 47 will be negative when the Measured Mask Transmission Signal MMT from the Generator 46 is less than the $T_{MIN}$ Signal. When this occurs, the $\Delta T$ output signal from the Adder 47 prohibits the system from accepting the shadow mask as an acceptable unit, as explained in detail hereinafter.

A Maximum Transmission Generator 49 establishes the Maximum Transmission $T_{MAX}$ permissible for a particular shadow mask type and provides the Maximum Transmission Signal $T_{MAX}$ to an Adder 51 which also receives the $T_{MIN}$ Signal from the Minimum Transmission Generator 48. The Adder 51 then algebraically combines the $T_{MAX}$ and $T_{MIN}$ signals to establish a Transmission Range $T_{range}$ equal to $T_{MAX}-T_{MIN}$. A Divider 52 receives the $\Delta T$ and $T_{range}$ Signals to provide a Transmission Ratio Signal $T_{ratio}$ ($\Delta T/T_{range}$ which represents the transmission ratio of the shadow mask 19. The Transmission Ratio $T_{ratio}$ is converted to a Transmission Percentage, % Trans by an Adder 53 which subtracts the $T_{ratio}$ Signal from one $(1-T_{ratio})$. The transmission Percentage Signal % Trans is provided as an input to a Cellspace Calculator 54.

A Maximum Exposure Time Generator 56 provides a Maximum Exposure Time Signal $ET_{MAX}$ which is representative of the maximum exposure time permissible for the system. The $ET_{MAX}$ signal is representative of the maximum exposure time permissible for the system and the value of the signal therefore is constant. Accordingly, the Generator 56 can be a microprocessor or other type of fixed signal source. The $ET_{MAX}$ Signal is input to the Cellspace Calculator 54. The Percent Transmission Signal % Trans from the Adder 53 and the $ET_{MAX}$ Signal are multiplied by the Cellspace Calculator 54 to provide a Cellspace Signal. The Cellspace Signal represents the Transparency of the shadow mask, and thus represents the total area of the apertures within the shadow mask. The cellspace output of the Calculator 54 is provided to a Preset Exposure Time Adder 57. A Minimum Exposure Time Generator 58 provides a Minimum Exposure Time Signal $ET_{MIN}$ which is representative of the minimum exposure time permitted for the system. The $ET_{MIN}$ Signal is provided to the Adder 57 and is added to the Cellspace Signal from the Calculator 54 to provide a Preset Exposure Time Signal. The Preset Exposure Time Signal T and the Minimum Exposure Time Signal $ET_{MIN}$ are provided to a Comparator 59 which verifies that the Exposure Time Signal T is greater than the $ET_{MIN}$ Signal. When $T>ET_{MIN}$ the Preset Exposure Time Signal T is provided on output line 61 and the signal is available for use in the systems described in the copending applications. When $T<ET_{MIN}$ the Difference Transmission Signal $\Delta T$ from the Adder 47 is negative indicating that the Measured Mask Transmission MMT does not exceed the Minimum Transmission $T_{MIN}$ and a disable signal is provided on output Line 62 of the Comparator 59.

If desired, the system can be operated manually by use of a Cell Code Generator 63. In utilizing the Cell Code Generator 63 the measured transmission capabilities of all types of shadow masks which are to be processed are categorized into various coded types. The code type for a particular shadow mask is set into the Cell Code Generator 63 and provided as an input to a Cellspace Generator 64. The Cell Code Generator 63 thus provides a signal which is representative of the transmission characteristic for the particular mask in the Panel 16 to be processed. The Cellspace Calculator 64 also receives the Maximum Exposure Time Signal $ET_{MAX}$ from the Generator 56. A fixed minimum exposure time of 0.05 is added to Cell Code Signal and the sum is multiplied by the $ET_{max}$ Signal to provide a Manual Cellspace Signal to the Adder 57. The manual cellspace output is then provided to the Preset Exposure Time Generator 57 and the operation is then the same as the automatic operation.

What is claimed is:

1. A system for determining the exposure time required to expose the screen of a television panel in accordance with the light transmission characteristics of the shadow mask associated with said screen comprising:

means for providing the actual transmission characteristics of said shadow mask;

means for providing a minimum acceptable transmission value;

means for providing the maximum acceptable transmission value;

means responsive to said actual transmission characteristics and said minimum transmission value for providing a transmission difference signal;

means responsive to said minimum transmission value and said maximum transmission value for providing a transmission range signal in accordance with the difference of said values;

means responsive to said transmission difference signal and said transmission range signal for providing a transmission ratio;

means responsive to said transmission ratio for providing a transmission percentage;

means for providing a maximum transmission time; and means responsive to said transmission percentage and said maximum transmission time for providing said exposure time.

2. The system of claim 1 further including means for providing a minimum exposure time signal to said means for providing said exposure time.

3. The system of claim 2 wherein said means for providing a transmission percentage includes means for subtracting said transmission ratio from one.

4. The system of claim 1 further including means for providing manually coded shadow mask transmissions to said means for providing said exposure time.

5. A method of determining the exposure time required to expose the screen of a television panel to energy from an exposing energy source in accordance with the energy transmission characteristics of the shadow mask associated with said screen including the steps of:

providing the actual transmission characteristics of said shadow mask;

providing a minimum acceptable transmission value and a maximum acceptable transmission value;

subtracting said minimum transmission value from said actual transmission to provide a transmission difference signal;

subtracting said minimum transmission value from said maximum transmission value to provide a transmission range signal;

dividing said transmission difference signal by said transmission range signal to provide a transmission ratio;

utilizing said transmission ratio to provide a transmission percentage;

providing a maximum transmission time; and combining said transmission percentage and said maximum transmission time to provide said exposure time.

6. The method of claim 5 wherein said step of combining includes combining a minimum exposure time signal together with said transmission percentage and said maximum transmission time to provide said exposure time.

7. The method of claim 6 wherein said step of combining includes multiplying said transmission percentage and said maximum transmission time to provide an output signal and adding said output signal with said minimum exposure time signal to provide said exposure time.

* * * * *